(12) United States Patent
Hsu

(10) Patent No.: US 8,496,370 B2
(45) Date of Patent: Jul. 30, 2013

(54) LIGHT GUIDE PLATE, LIGHT GUIDE PLATE MOLD INSERT AND METHOD FOR MAKING LIGHT GUIDE PLATE

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/040,283

(22) Filed: Mar. 4, 2011

(65) Prior Publication Data

US 2012/0163032 A1 Jun. 28, 2012

(30) Foreign Application Priority Data

Dec. 28, 2010 (TW) .............................. 99146194 A

(51) Int. Cl.
*F21V 7/04* (2006.01)
*B29D 7/00* (2006.01)
(52) U.S. Cl.
USPC ............. 362/623; 362/607; 362/619; 249/62; 264/1.24

(58) Field of Classification Search
USPC ..... 362/623, 625, 626, 628, 619, 607; 349/62
See application file for complete search history.

(56) References Cited

U.S. PATENT DOCUMENTS

| 5,390,436 | A  | * | 2/1995 | Ashall ............................... 40/546 |
| 7,563,013 | B2 | * | 7/2009 | Lin et al. ......................... 362/620 |
| 7,690,811 | B2 | * | 4/2010 | Durvasula et al. ............. 362/246 |
| 8,434,923 | B2 | * | 5/2013 | Huang ............................ 362/612 |
| 2006/0133113 | A1 | * | 6/2006 | Koike et al. ................... 362/626 |

* cited by examiner

*Primary Examiner* — Anabel Ton
(74) *Attorney, Agent, or Firm* — Altis Law Group, Inc.

(57) ABSTRACT

A light guide plate mold insert includes a molding surface and a number of uniformly distributed dot-shaped recesses. The molding surface is used for forming a reflective surface of a light guide plate. The uniformly distributed dot-shaped recesses are formed in the molding surface. The molding surface includes a number of frosted regions formed by machining the molding surface using a sand-blasting process. Each of the frosted regions includes a number of dot-shaped micro recesses. A distribution density of the micro recesses are greater than that of the recesses.

10 Claims, 7 Drawing Sheets

LIGHT GUIDE PLATE, LIGHT GUIDE PLATE MOLD INSERT AND METHOD FOR MAKING LIGHT GUIDE PLATE

BACKGROUND

1. Technical Field

The present disclosure relates to light guide plates, light guide plate mold inserts and methods for making light guide plates.

2. Description of Related Art

Liquid crystal display devices typical include a backlight module for providing light for a liquid crystal panel. An essential member of the backlight module is a light guide plate.

Injection molding is a current molding method for molding the light guide plate. A mold insert is secured in a mold cavity. Then, molding material is introduced into the mold cavity. After the molding material is cooled, a light guide plate is ejected from the mold cavity. However, a light uniformity of the light guide plate formed by a typical mold insert is unsatisfactory.

Therefore, a light guide plate, a light guide plate mold insert and a method for making a light guide plate, which can overcome the above-mentioned problems, are needed.

DETAILED DESCRIPTION

Figure 1:
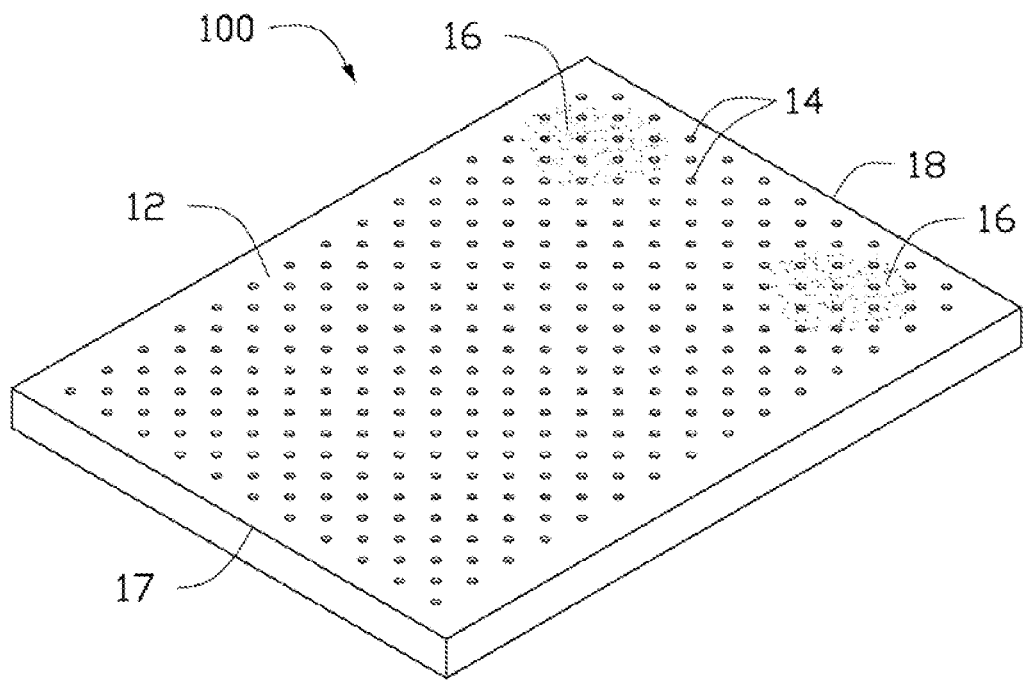
FIG. 1 is a schematic view of a light guide plate mold insert, according to a first embodiment.

Referring to FIG. 1, a light guide plate mold insert 100, according to a first embodiment, includes a molding surface 12, and a number of uniformly distributed dot-shaped recesses 14. The dot-shaped recesses 14 are formed in the molding surface 12.

Figure 5:
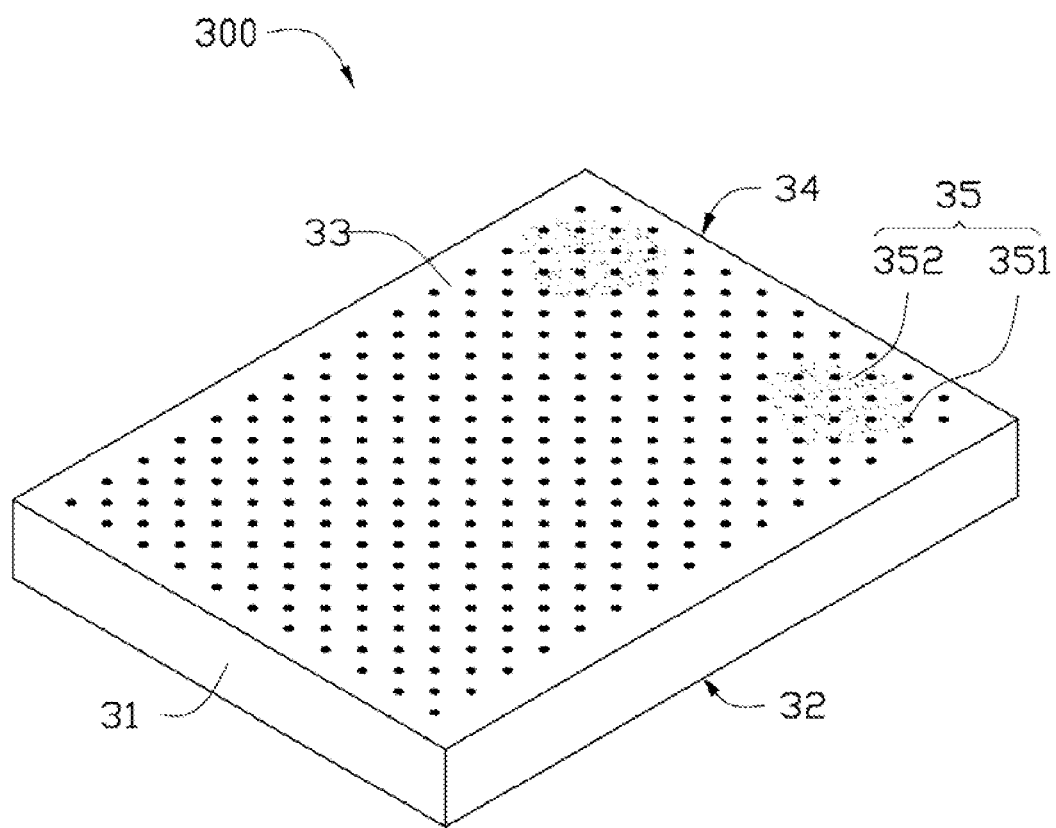
FIG. 5 is a schematic view of a light guide plate, according to a second embodiment.

Material of the mold insert 100 is stainless steel. The molding surface 12 is a mirror surface and is configured for molding a reflective surface (a bottom surface) 33 of a light guide plate 300 (see FIG. 5).

The dot-shaped recesses 14 are formed in the molding surface 12 by laser radiation. The first side 17 is opposite to the second side 18.

The molding surface 12 includes two frosted regions 16. In this embodiment, a surface roughness of each frosted region 16 is in a range from about 0.5 to about 0.7 microns. Each frosted region 16 is formed by machining the molding surface 12 using a sand-blasting process. The frosted region 16 includes a number of dot-shaped micro recesses. The greater the surface roughness of the frosted region 16 is, the greater the density of the micro recess is. The distribution density of the micro recesses is greater than that of the recesses 14.

Each of the frosted regions 16 is adjacent to a corresponding corner of the molding surface 12 adjacent to the second side 18. Each frosted region 16 surrounds some recesses 14.

During the sand-blasting process, a nozzle is used to deliver a fine stream of the abrasive material. Parameters for the sand-blasting process include an abrasive material, a blast height of the nozzle, a movement pitch of the nozzle, a speed of the nozzle and a blast pressure (see Table 1). In this embodiment, material of the mold insert 100 is stainless steel. Thus, carborundum (SiC) is used as the abrasive material.

TABLE 1

| abrasive material | blast height | movement pitch | speed | blast pressure | surface roughness |
|---|---|---|---|---|---|
| SiC | 150 mm | 5 mm | 150~200 mm/s | 0.2~0.4 MPa | 0.5~0.7 μm |

Figure 2:
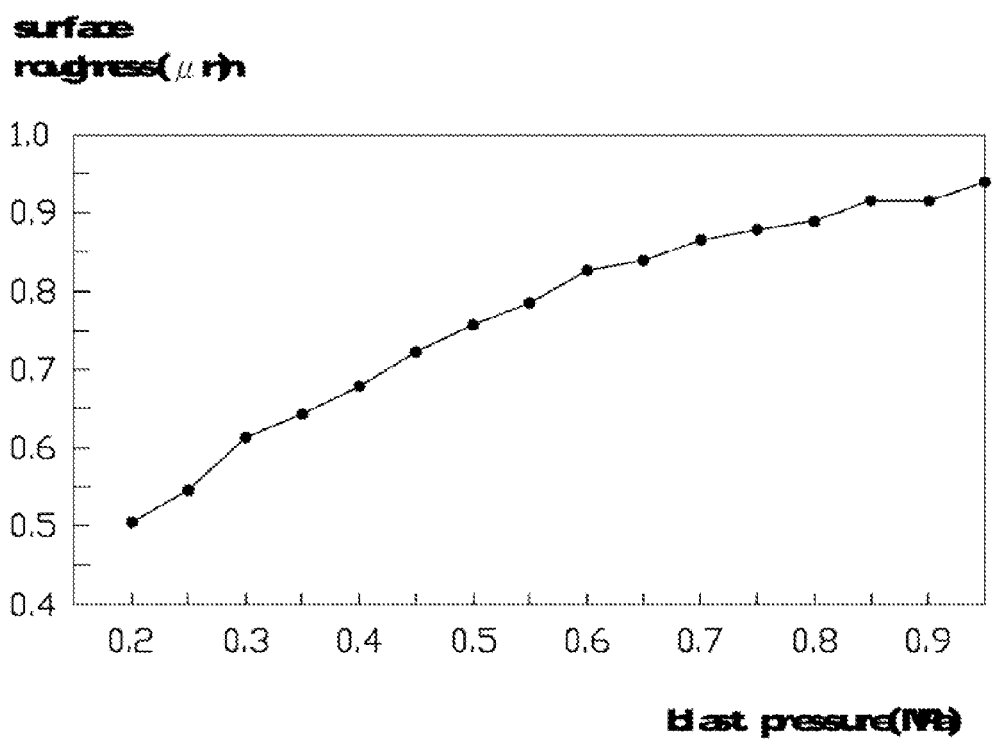
FIG. 2 is a diagram showing relationships between parameters for a sand-blasting process for machining the mold insert of FIG. 1.
Figure 3:
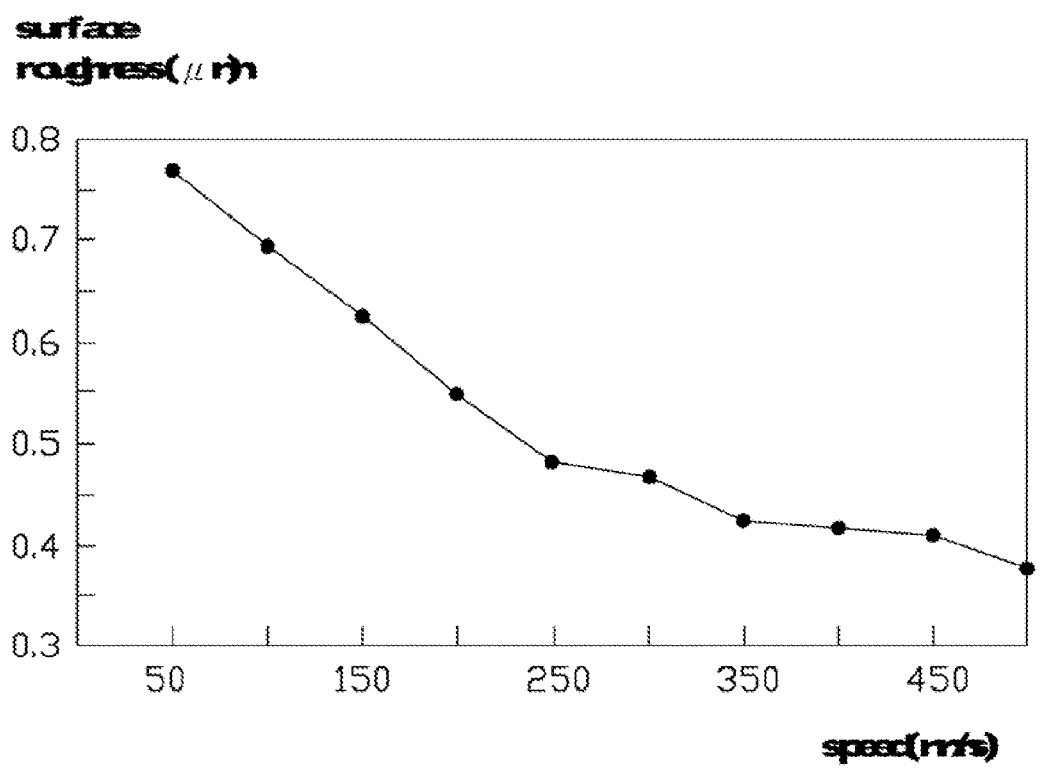
FIG. 3 is similar to FIG. 2, but showing relationships between other parameters for the sand-blasting process for machining the mold insert of FIG. 1.

A first diagram showing relationships between the blast pressure and the surface roughness is shown in FIG. 2 when the blast height of the nozzle is 150 mm, the speed of the nozzle 150 mm/s movement pitch, and the movement pitch of the nozzle is 5 mm. A second diagram showing relationships between the moving speed of the nozzle and the surface roughness is shown in FIG. 3 when the blast height of the nozzle is 150 mm, the blast pressure is 3 MPa, and the movement pitch of the nozzle is 5 mm. Thus, the parameters for the sand-blasting process can be adjustable according to these diagrams for different desirable surface roughness.

Figure 4:
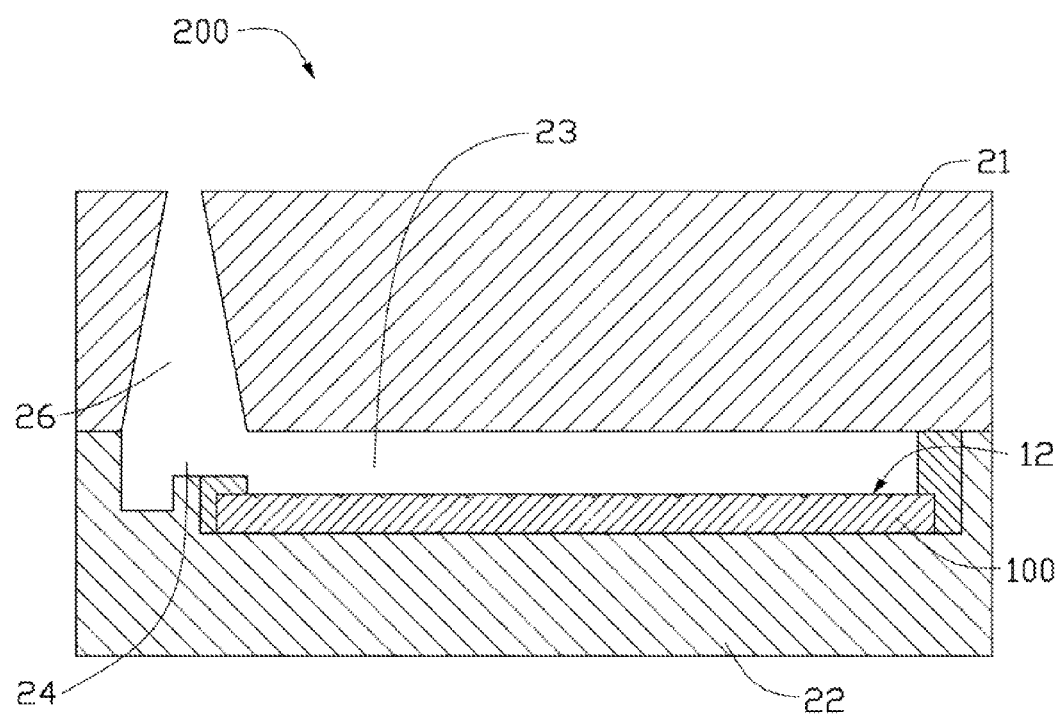
FIG. 4 is a sectional view of a mold for molding a light guide plate using the mold insert of FIG. 1.

Referring to FIG. 4, when in use, the mold insert 100 is placed and secured in a mold 200. The mold 200 includes a mold cavity 21 and a mold core 22. The mold insert 100 is secured on a bottom surface of the mold core 22 with the molding surface 12 facing the mold cavity 21. The mold cavity 21 has a sprue 26. A diameter of the sprue 26 increases from the mold cavity 21 to the mold core 22. A gate 24 is formed at interface of the mold cavity 21 and the mold core 22. The gate 24 is in communication with the sprue 26. The mold cavity 21 and the mold core 22 cooperatively form a molding cavity 23. The molding cavity 23 is in communication with the gate 24, and the sprue 26.

When making a light guide plate, a molding material, such as polymethyl methacrylate, is introduced into the molding cavity 23 through the sprue 26 and the gate 24. After the molding material 23 is full, the molding material is cooled and the mold core 22 is detached from the mold cavity 21. The light guide plate 300 is then ejected out from the mold cavity 21 by an ejector means, as shown in FIG. 3.

The light guide plate 300 includes a light incident surface 31, a light emitting surface 32, a reflective surface 33, a side surface 34 and micro structures 35.

The light incident surface 31 connects the light emitting surface 32 and the reflective surface 33. The side surface 34 connects the light emitting surface 32 and the reflective surface 33. The light incident surface 31 and the side surface 34 are at opposite sides of the light guide plate 300. The micro structures 35 are formed on the reflective surface 33. The reflective surface 33 and the micro structures 35 are formed by the mold insert 100. The molding surface 12 forms the reflective surface 33. The micro structures 35 include a number of dots 351 and two frosted regions 352. The dot-shaped recesses 14 form the dots 351. The frosted regions 16 of the mold insert 100 form the frosted regions 352 of the light guide plate 300. A surface roughness of each frosted region 352 is in a range from about 0.5 to about 0.7 microns. The two frosted regions 352 are located at respective corners of the reflective surface 33 adjacent to the side surface 34. Each frosted region 352 includes a number of micro dots formed by the micro recesses of the frosted region 16. The distribution density of the micro dots is greater than that of the dots 351.

Figure 6:
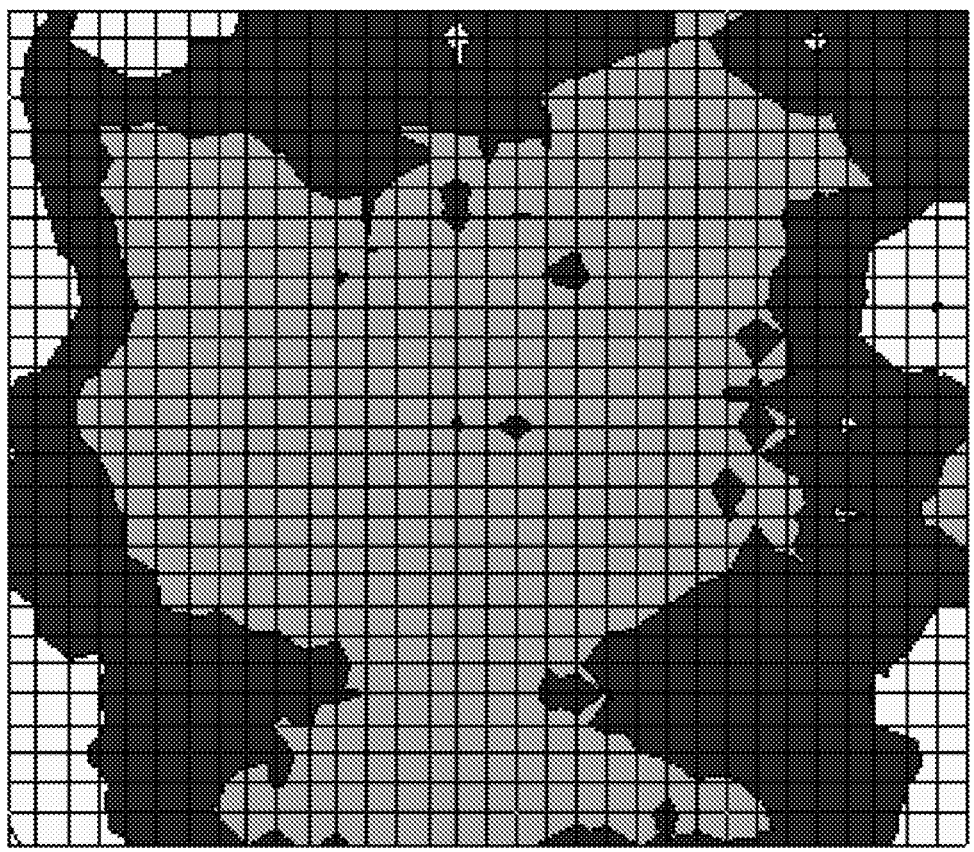
FIG. 6 is a picture showing a brightness distribution of a light emitting surface of the light guide plate of FIG. 5.
Figure 7:
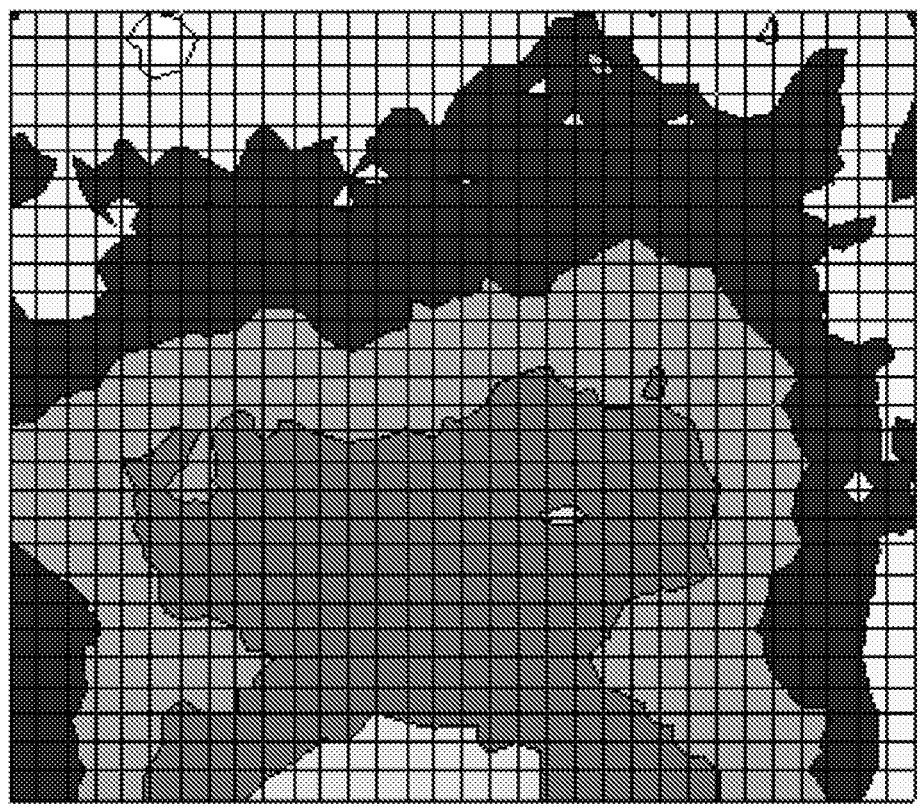
FIG. 7 is similar to FIG. 6, but showing a brightness distribution of a light emitting surface of another light guide plate, compared with the light guide plate of FIG. 5.

Referring to FIGS. 6 and 7, FIG. 6 is a picture showing a brightness distribution of the light emitting surface 32 of the light guide plate 300 detected by a brightness meter. A reference character 'A' in FIG. 6 represents a side of the light guide plate 300 adjacent to the light incident surface 31, and a reference character 'B' in FIG. 6 represents a side of the light guide plate 300 adjacent to the side surface 34. FIG. 7 is another picture showing a brightness distribution of a light emitting surface of another light guide plate detected by the brightness meter, compared with the light guide plate 300. A reference character 'A1' represents a side of the another light guide plate adjacent to a light incident surface of the another light guide plate, and a reference character 'B1' represents a side of the another light guide plate adjacent to a side of the another light guide plate opposite to the light incident surface of the another light guide plate.

In the brightness distribution of FIG. 7, a lowest brightness is 4695 $cd/m^2$ and a highest brightness is 6156 $cd/m^2$. Difference between the lowest brightness and the highest brightness is equal to 1461 $cd/m^2$, and light uniformity of the light emitting surface of the another light guide plate is equal to about 76.27% (4695/6156). In the brightness distribution of FIG. 6, a lowest brightness is 4746 $cd/m^2$, and a highest brightness is 5646 $cd/m^2$. Difference between the lowest brightness and the highest brightness is equal to 900 $cd/m^2$, and light uniformity of the light emitting surface 32 of the light guide plate 300 is equal to about 84.06% (4746/5646). Thus, the light guide plate 300 of the present embodiment can improve the light uniformity thereof and eliminate dark areas in the light guide plate 300.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A light guide plate mold insert, comprising:
   a molding surface for forming a reflective surface of a light guide plate; and
   a plurality of uniformly distributed dot-shaped recesses formed in the molding surface;
   wherein the molding surface includes a plurality of frosted regions formed by machining the molding surface using a sand-blasting process, each of the frosted regions surrounded by a corresponding portion of the plurality of recesses and comprising a plurality of dot-shaped micro recesses, and a distribution density of the micro recesses being greater than that of the recesses.

2. The mold insert of claim 1, wherein a surface roughness of each of the frosted regions is in a range from about 0.5 to about 0.7 microns.

3. The mold insert of claim 1, wherein the molding surface is substantially rectangular, and each of the frosted regions is adjacent to a corner of the molding surface.

4. A method for making a light guide plate, comprising:
   providing a light guide plate mold insert of claim 1;
   placing the mold insert into a molding cavity of a mold;
   injecting a molding material into the molding cavity;
   cooling the molding material in the mold; and
   ejecting the light guide plate out from the mold.

5. The method of claim 4, wherein a surface roughness of each of the frosted regions is in a range from about 0.5 to about 0.7 microns.

6. A light guide plate formed by the following method: providing a light guide plate mold insert; placing the mold insert into a molding cavity of a mold; injecting a molding material into the molding cavity; cooling the molding material in the mold; and ejecting the light guide plate out from the mold; wherein the light guide plate mold insert comprises a molding surface for forming a reflective surface of a light guide plate and a plurality of uniformly distributed dot-shaped recesses formed in the molding surface, and the molding surface includes a plurality of frosted regions formed by machining the molding surface using a sand-blasting process, each of the frosted regions comprising a plurality of dot-shaped micro recesses, and a distribution density of the micro recesses being greater than that of the recesses, the light guide plate comprising:
   a reflective surface;
   a plurality of dots formed in the reflective surface; and
   a plurality of frosted regions formed in the reflective surface, each of the frosted regions comprising a plurality of micro dots, a distribution density of the micro dots being greater than that of the dots.

7. The light guide plate of claim 6, further comprising a light incident surface, a light emitting surface and a side surface, wherein the light incident surface connects the light emitting surface and the reflective surface, the side surface connects the light emitting surface and the reflective surface, and the light incident surface and the side surface are positioned at opposite sides of the light guide plate.

8. The light guide plate of claim 7, wherein the frosted regions are located at respective corners of the reflective surface adjacent to the side surface.

9. The mold insert of claim 2, wherein the plurality of frosted regions comprises two frosted regions, the molding surface is substantially rectangular and comprises a first side and a second side opposite to the first side, and the two frosted regions are arranged at two neighboring corners of the molding surface and are adjacent to the second side.

10. The light guide plate of claim 6, wherein each of the frosted regions is surrounded by a corresponding portion of the plurality of recesses.

\* \* \* \* \*